United States Patent [19]

MacMinn et al.

[11] Patent Number: 4,933,620

[45] Date of Patent: Jun. 12, 1990

[54] CONTROL SYSTEM FOR LOW SPEED SWITCHED RELUCTANCE MOTOR

[75] Inventors: Stephen R. MacMinn, Schenectady, N.Y.; James W. Sember, Roanoke, Va.

[73] Assignee: General Electric Company, Salem, Va.

[21] Appl. No.: 351,504

[22] Filed: May 9, 1989

[51] Int. Cl.$^5$ .............................................. H02P 8/00
[52] U.S. Cl. ................................... 318/696; 318/685; 318/701
[58] Field of Search ........................ 318/696, 685, 701

[56] References Cited

U.S. PATENT DOCUMENTS

| 4,253,053 | 2/1981 | Ray et al. | 318/701 |
| 4,707,650 | 11/1987 | Bose | 318/685 |
| 4,739,240 | 4/1988 | MacMinn et al. | 318/696 |

OTHER PUBLICATIONS

B. K. Bose et al.; "Microcomputer Control of Switched Reluctance Motor"; IEEE Transactions on Industry Applications; Jul./Aug. 1986, pp. 708-715.
J. T. Bass et al.; "Robust Torque Control of Switched-Reluctance Motors Without a Shaft-Position Sensor"; Aug. 1986; pp. 212-216 (IEEE Transactions on Industrial Electronics).

*Primary Examiner*—William M. Shoop, Jr.
*Assistant Examiner*—Saul M. Bergmann
*Attorney, Agent, or Firm*—Arnold E. Renner

[57] ABSTRACT

A method and apparatus for improving the operation of a switched reluctance motor at low speed incorporates an advance angle regulator which regulates the firing angle of current pulses to the switched reluctance motor so that over a wide range of speeds and levels for direct current source voltages, the winding current reaches a commanded set point at a commanded angle. The advance angle regulator may comprise a closed loop regulator which includes apparatus for detecting the actual angular position at which motor current reaches a commanded level and adjusts the turn-on angle to shift the angle at which current reaches its desired level to a desired angle. The regulator incorporates a feedforward portion and an integral portion. The feedforward portion is utilized primarily to accommodate situations in which there is no current feedback. The integral portion provides the primary regulation when current is regulated to its desired value. The regulator causes the torque versus current command to have a transfer function which does not depend upon speed or DC source voltage over a wide range of speed, voltage and torque.

14 Claims, 5 Drawing Sheets

FIG. 2B
FORWARD MOTORING (FM)

FIG. 2C
REVERSE MOTORING (RM)

CONTROL SYSTEM FOR LOW SPEED SWITCHED RELUCTANCE MOTOR

BACKGROUND OF THE INVENTION

This invention relates generally to motor controls and, more particularly, to a control system and method of control for a switched reluctance motor.

Switched reluctance motors conventionally have multiple poles or teeth or both stator and rotor, i.e., they are doubly salient. There are phase windings on the stator but no windings on the rotor. Each pair of diametrically opposite stator poles is connected in series to form one phase of a multi-phase switched reluctance motor. Torque is produced by switching current into each of the phase windings in a predetermined sequence that is synchronized with the angular position of the rotor, so that a magnetic force of attraction results between the rotor and stator poles that are approaching each other. The current is switched off in each phase before the rotor poles nearest the stator poles of the phase rotate past the aligned position. Otherwise, the magnetic force of attraction would produce a negative or braking torque. The torque developed is independent of the direction of current flow so that unidirectional current pulses synchronized with rotor movement can be applied to develop torque in either direction. These pulses are generated by a converter using current switching elements such as thyristors or transistors.

In operation, each time a phase of the switched reluctance motor is switched on by closing a switch in a converter, current flows in the stator winding of that phase, providing energy from a direct current (DC) supply to the motor. The energy drawn from the supply is converted partly into mechanical energy by causing the rotor to rotate toward a minimum reluctance configuration and partly in stored energy associated with the magnetic field. After the switch is opened, part of the stored magnetic energy is converted to mechanical output and part of the energy is returned to the DC source.

U.S. Pat. No. 4,707,650 describes a control system for a switched reluctance motor employing a programmable, closed loop, four quadrant control system incorporating feedback control, angle control and current control. The feedback control incorporates a speed feedback loop and/or a torque feedback loop. The angle control digitally synchronizes stator phase current pulses with rotor position, and the current control acts as a chopping or bang-bang controller to limit the magnitude of the stator phase current pulses. The magnitude and turn-on and turn-off angles of the stator current pulses for each phase, in feedback mode, are controlled so as to provide smooth operation and full torque and speed range with optimum performance in all four quadrants of motor operation, i.e., forward motoring, forward braking, reverse motoring and reverse braking.

The closed loop feedback control processes an actual motor speed signal and an operator command to generate a current command, which serves to limit magnitude of actual phase current, and also generates a turn-on angle signal and a pulse width angle signal which are coordinated with a particular quadrant in which the motor is operating. The values of turn-on angle and pulse width angle are programmable for different quadrants of operation. For motoring quadrants, the turn-on angle signal is directly proportional to the current command while the pulse width angle signal is a function of the current command and actual motor speed.

The digital angle control processes rotor position information signals to generate a multi-phase sync pulse train and individual stator phase signals for the respective stator phases. The angle control also generates a resolution signal with the desired angle resolution. The angle control employs the resolution signal and the individual stator phase sync signals to convert a turn-on angle signal and a pulse width angle signal into corresponding current pulses synchronized with rotor position for each of the stator phases.

The current control compares the current command from the feedback control with actual current in each stator phase to generate a current magnitude limiting signal and couples this signal with the pulse train for each phase from the angle control to generate the stator current control pulses applied to the switching elements in the motor power converter.

While the disclosed system provides for suitable control of a switched reluctance motor, it is believed that further improvement and operation can be attained over a relatively broad low speed range, e.g., for speeds up to about 16,000 rpm, by providing a control system which assures that winding current reaches its commanded set point value at a commanded angle. This desirable feature, which was addressed in one form in the aforementioned U.S. Pat. No. 4,707,650, is important to the operation of the switched reluctance motor over a wide speed range because the counter electromotive force (CEMF) in the motor is a function of the angular velocity of the rotor of the motor. For example, with the same set of turn-on and turn-off angles at higher speed, the CEMF is positive in polarity at the beginning of a current pulse, thus opposing the injection of current into the winding, while the end of the current pulse may extend past the alignment position causing the CEMF to become negative in polarity and forcing current to be retained in the winding. The amount of delay in the current pulse reaching its desired value is a function of current level, speed, position of the current pulse and DC source voltage. The effect, given a fixed set of turn-on and turn-off angles, is to greatly reduce the amount of motoring torque that can be produced as speed increases thus causing the torque, as a function of current, to become a strong function of motor speed.

SUMMARY OF THE INVENTION

It is an object of the present invention to provide an improved control system for a switched reluctance motor, which system controls current pulse timing over wide speed ranges.

The present invention overcomes the above and other disadvantages of the prior art systems by incorporating an advance angle regulator which establishes the firing angle of current pulses to the switched reluctance motor so that over a wide range of speeds and levels of direct current source voltages, the winding current reaches the commanded set point at a commanded angle. In a preferred form, the advance angle regulator comprises a closed loop regulator utilizing both hardware and software controls. In this embodiment, the position of the rotor is provided by a resolver in a manner disclosed in the aforementioned U.S. Pat. No. 4,707,650. A comparison subsystem in the regulator compares a signal proportional to the phase current in the motor with a phase current reference. When the phase current first reaches the level of the reference, a state change is detected by the comparison subsystem and utilized to retain the rotor angular position at the instant that the phase current reached the reference value. This information is then used in a feedback control system to adjust the turn-on and turn-off angles to assure that current reaches the commanded value at the commanded angle. Reset circuitry is provided to reset the comparison subsystem after the present current pulse reaches a zero value. This assures that the rotor position which is latched by the comparison system is a first position at which the current reached the reference level during the monitored current pulse. In this system, the position feedback can be obtained at any time during the current pulse and allows the advance angle regulator to continuously adjust the turn-on angle and turn-off angle to the optimum values.

The advance angle regulator, in an illustrative embodiment, incorporates a feed foward portion and an integral portion. The integral portion includes clamps and a rate limit to limit the excursion and rate of change of signals in that portion of the regulator. The feed forward portion is desirable at high speeds to avoid a condition that might occur if switching occurs at high current levels so as to eliminate feedback available to the integral plus portion of the circuit. For example, there may be no feedback if the current does not reach the commanded set point during a current pulse. The feed forward portion is helpful at low speeds to improve the dynamic response of the regulator by predicting the rise time of the current pulse.

In the practice of the present invention, control of the phase current pulses is accomplished by first selecting the optimum turn-on and turn-off angles at very low speed where the current rise time is negligible. These angles are then fixed throughout the entire speed range. The output of the advance angle regulator is a position adjust angle which is combined with the optimum turn-on and turn-off angles at speeds where the current rise time is significant. In this manner, the advance angle regulator assures that the current reaches its set point at the optimum angle. The regulator causes the torque versus current command to have a transfer function which does not depend upon speed or DC source voltage over a wide range of speed, voltage and torque.

BRIEF DESCRIPTION OF THE DRAWINGS

The foregoing and other objects, features and advantages of the present invention will be apparent from the following detailed description of the invention when read in conjunction with the accompanying drawings in which.

DETAILED DESCRIPTION OF THE INVENTION

Figures 1A, 3:
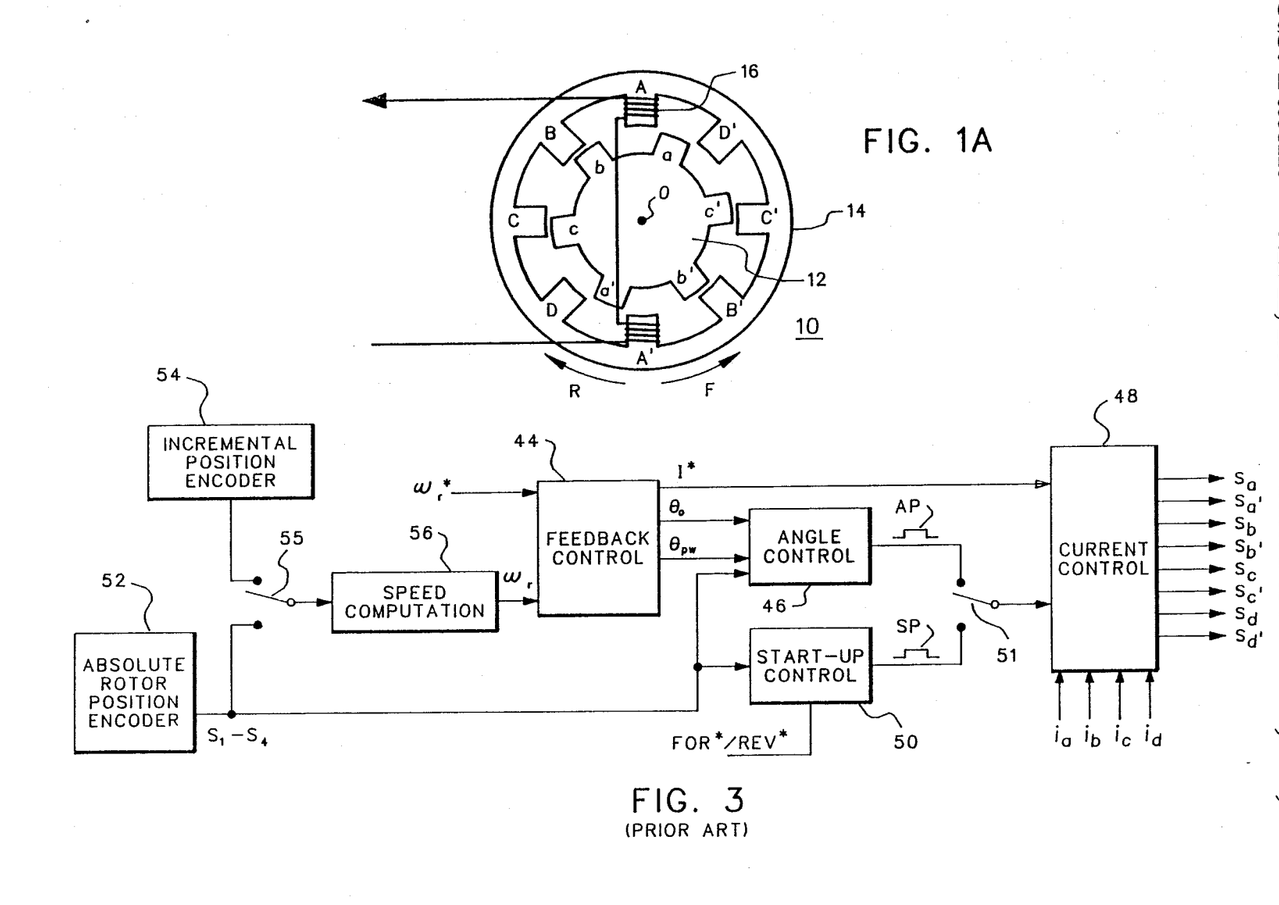
FIG. 1A is a schematic representation of a typical switched reluctance motor.
FIG. 3 is a simplified functional block diagram of a switched reluctance motor control system in accordance with the prior art with which the present invention may be used.

FIG. 1A is a schematic representation of a typical switched reluctance motor 10 including a rotor 12 rotatable in either a forward or a reverse direction within a stator 14. The forward direction F indicates counterclockwise rotation of the rotor while the reverse direction R indicates clockwise rotation. Rotor 12 has three pairs of diametrically opposite poles labeled a—a', b—b' and c—c'. Stator 14 is provided with four pairs of diametrically opposite stator poles labeled A—A', B—B', C—C' and D—D'. For purpose of discussion, the motor 10 is assumed to be constructed such that each rotor pole and each stator pole has an angular extent of 18°. The circumferential spacing or gap between adjacent rotor poles in this embodiment is 42° while the gap between adjacent stator poles is 27°. These angles are measured with respect to center point 0.

The opposite poles of each stator pole pair share a common winding and define a respective stator phase. A representative winding coil 16 for phase A is illustrated in FIG. 1A. Similar windings are provided for each of the other stator pole pairs.

Rotor rotation is produced by switching current on and off in each stator phase winding in a predetermined sequence synchronized with angular position of the rotor. Current in each stator phase is derived from power converter 20 of FIG. 1B, which impresses a DC link voltage $V_d$ across the four parallel stator phase legs PH-A, PH-B, PH-C and PH-D. Link voltage $V_d$ can be obtained from a battery (not shown), or from an AC power supply, e.g., three phase, 220 volt, 60 Hertz line, through a conventional diode rectifier circuit 22 and filtering capacitor 23.

Figure 1B:
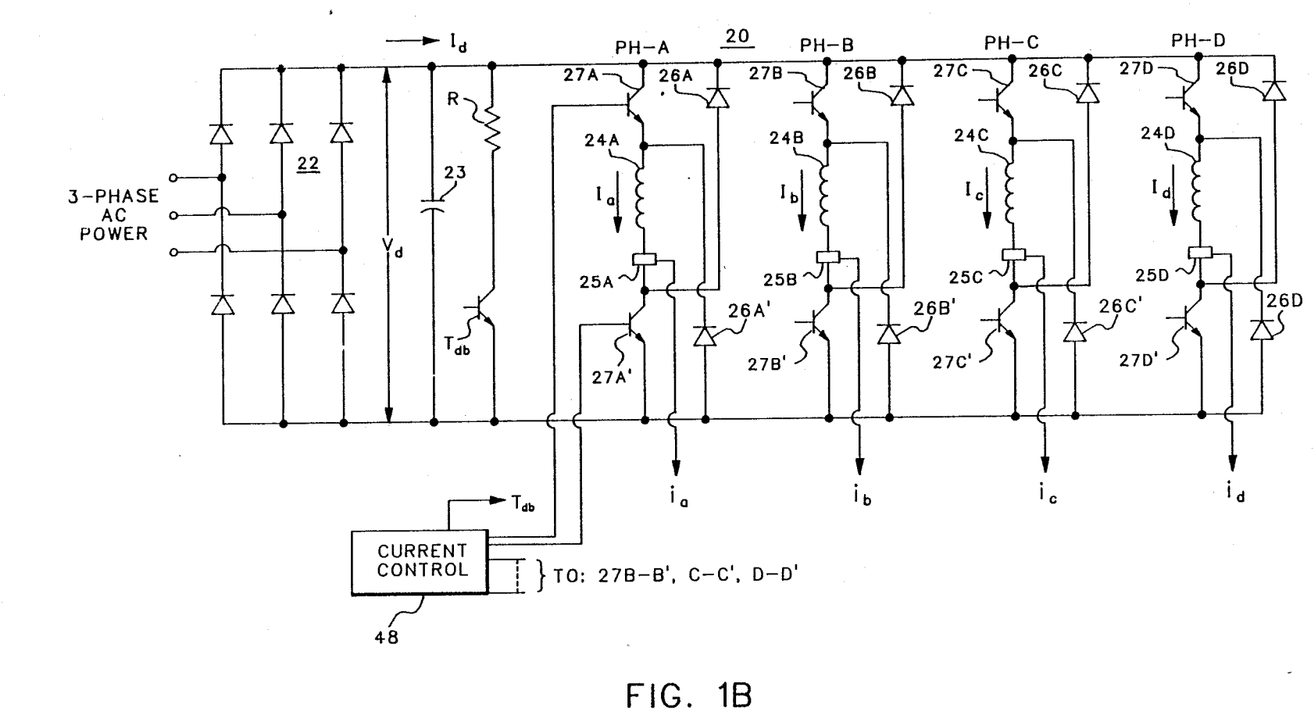
FIG. 1B illustrates a typical power converter for the switched reluctance motor of FIG. 1A.

The convertor circuitry for each stator phase leg is identical. The PH-A leg, for example, includes a stator winding 24A, first and second flyback diodes 26A and 26A' and first and second current switching devices such as transistors 27A and 27A' interconnected as shown in FIG. 1B. A base of each of the transistors is connected to an output of the current control 48.

When transistors 27A and 27A' are switched on, a phase current $I_a$, derived from link current $I_d$ flows through the stator winding for phase A. When the transistors 27A and 27A' are switched off, current in the winding 24A decays by re-circulating to the source or to the filter capacitor 23 through the flyback diodes 26A and 26'. During braking, a dynamic brake transistor $T_{db}$ in series with a resistor R across the rectified AC source is switched on to dissipate recovered energy in resistor R rather than transferring it into capacitor 23. Alternatively, with a battery power supply, the energy could be absorbed by the battery. A signal, $i_a$, representative of phase current, $I_a$, is generated by any suitable means 25A, such as a shunt or a current transducer such as that commercially provided by Liaisons Electroniques Mechaniques S.A. of Geneva, Switzerland.

Figures 2A, 2B:
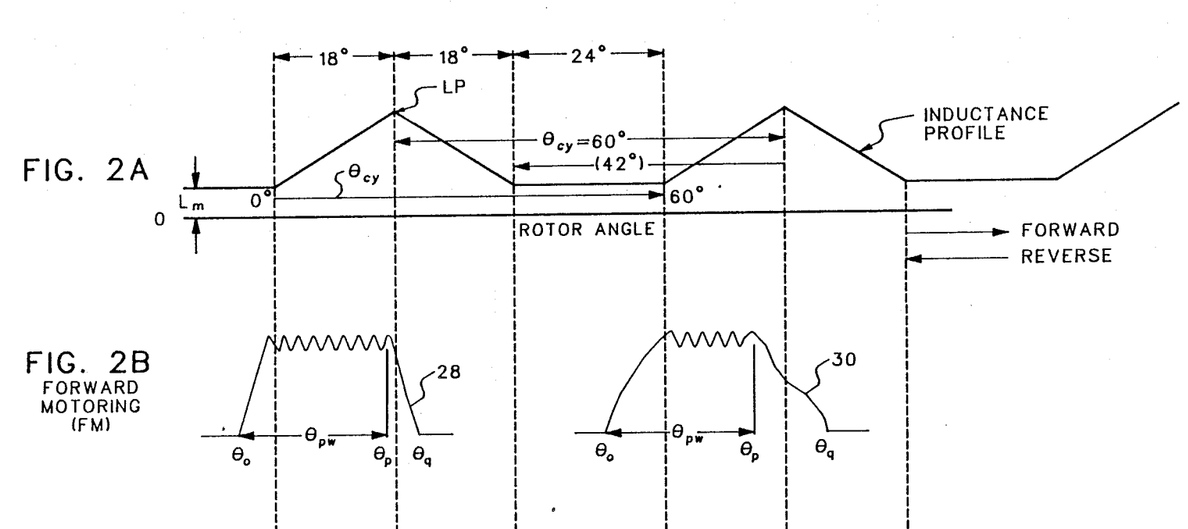
FIG. 2A profiles inductance with respect to rotor angular position for a stator pole pair of the motor of FIG. 1A.
FIGS. 2B and 2C illustrate typical stator phase current pulses for forward motoring and reverse motoring, respectively.
Figure 2C:
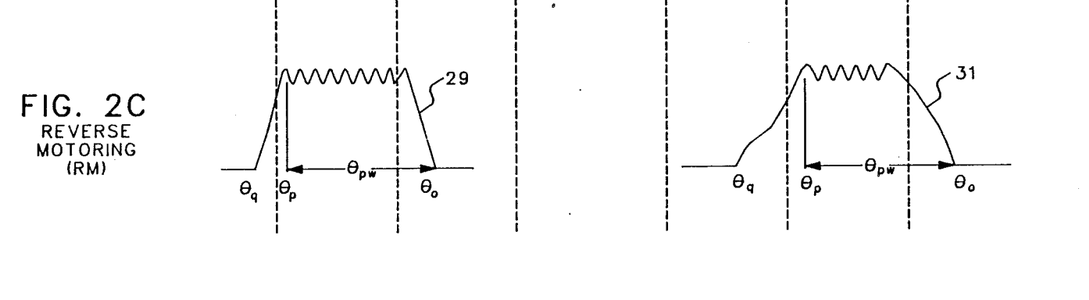

The converter circuitry for each of the other phase legs operates identically and accordingly is not detailed herein. The transistors coupled in series with each of the phase windings are made to conduct in sequence, with the order of conduction depending upon the direction of rotation. In the illustrative embodiment, a particular phase is fired periodically with a cycle period of 60° with respect to rotor position and, therefore, for the four phase machine, consecutive phases are fired at 15° intervals. The timing and wave shape of stator phase current pulses for different quadrants of operation are shown in FIGS. 2A–2C. The inductance profile of a stator pole pair, e.g., a phase A, with respect to rotor angular orientation is shown in FIG. 2A, while typical stator phase current pulses for the various quadrants are illustrated in FIGS. 2B–2C. The inductance profile has a cycle period $\theta_{cy}$ equal to 60° and the distribution of rising inductance, falling inductance and minimum inductance periods, for both forward and reverse direction rotations and reference frames, is shown in FIG. 2A. For forward rotation, the inductance increases for the first 18°. At 18°, a rotor pole is aligned with a stator pole and peak inductance $L_p$ is achieved. From 18°–36°, the inductance falls and for the next twenty-four degrees remains at a minimum inductance $L_m$, then the cycle repeats. For reverse rotation, the inductance falls from 0° to 18°, remains at a minimum inductance $L_m$ from 18° to 42°, and then rises to the peak inductance $L_p$ from 42° to 60°.

Examining FIGS. 2A and 2B, it will be seen that in a forward motoring (FM) quadrant, the stator current pulse 28 is established where the inductance profile has a positive slope. Current I is switched on at a turn-on angle $\theta_O$ and rises linearly to the magnitude of I at the corner point (0°) of the inductance profile. Current I is maintained substantially constant by chopping or bang-bang control and is controlled such that I is essentially equal to the commanded current I*. The transistor switches coupled in series with the winding 24 are switched off at a turn-off angle $\theta_p$, which is a few degrees ahead of the peak inductance $L_p$ point, so that the angle $\theta_q$, at which the current reaches zero, occurs only slightly into the negative inductance slope region. A pulse width angle $\theta_{pw}$ extending from the transistor turn-on angle $\theta_O$ to the transistor turn-off angle $\theta_p$ is shown in FIG. 2B.

As actual speed $\omega_r$ increases, angle $\theta_O$ and $\theta_q$ expand or spread apart from each other, but the pulse width angle $\theta_{pw}$ remains unchanged, as shown by pulse 30 in FIG. 2B. At high speed, the machine CEMF exceeds the DC supply voltage and bang-bang current control is lost. The expansion of angles $\theta_o$ and $\theta_q$ is controlled to optimize torque production.

As shown in FIG. 2C, current pulse wave shape 29, at low speed, and 31, at high speed, in reverse motoring (RM) are identical to those in forward motoring, except that they are reversed in direction and occur during the opposite slope of the inductance profile, which appears as a positive slope in the reverse direction.

The basic control parameters of the switched reluctance motor drive system can be summarized as follows:
I is the chopping current level;
$\theta_O$ is the transistor turn-on angle;
$\theta_p$ is the transistor turn-off angle; and
$\theta_{pw}$ is the difference between $\theta_o$ and $\theta_p$.

Referring now to FIG. 3, there is shown a simplified functional block diagram of one form of control system for a switched reluctance motor with which the present invention may be advantageously used. The basic control system includes feedback control block 44, angle control block 46, and current control block 48. In addition, a start-up control block 50, an absolute rotor position encoder block 52, an incremental position encoder block 54 and a speed calculator block 56 are included.

Feedback control block 44 may comprise a speed loop, a torque loop or a speed loop with an inner torque feedback loop. As illustrated, FIG. 3 incorporates a speed loop. The feedback control receives an operator command, e.g., speed command $\omega_r^*$ and an actual speed signal $w_r$ from speed computation block 56. The closed loop feedback control processes the operator command and actual speed signal to generate a current command I*, a turn-on angle signal $\theta_O$ and a pulse width angle signal $\theta_{pw}$. The values of the turn-on angle and pulse width angle signals may be independently programmable for different quadrants of operation. For example, the turn-on angle signal may be made directly proportional to the current command, and the pulse width angle signal or turn-off angle signal is made a function of the current command and actual motor speed. A detailed description of one form of implementation of feedback control 44 may be had by reference to the aforementioned U.S. Pat. No. 4,707,650.

Angle control 46 receives the turn-one angle signal $\theta_O$ and the turn-off or pulse width angle signal $\theta_{pw}$ from feedback control 44, and rotor position information signals $S_1$, $S_2$, $S_3$ and $S_4$ from encoder 52. The angle control digitally processes these signals to provide mutually phase shifted pulse trains for the different stator phases, each pulse train comprising conduction angle pulses synchronized with the rotor position and coordinated with an inductance profile of the motor in accordance with the selected quadrant of motor operation.

Current control 48 receives the current command I* from feedback control 44, the actual current representative signals $i_a$, $i_b$, $i_c$ and $i_d$ for each stator phase, and the pulse trains from angle control 46. The current control processes these signals to provide switching control signals $S_a$—$S_a'$, $S_b$—$S_b'$, $S_c$—$S_c'$, and $S_d$—$S_d'$ to the base terminals of transistor pairs such as, for example, transistor pair 27A and 27A' in FIG. 1B. The current control preferably operates on a bang-bang control principle and serves to maintain amplitude of actual current in each stator phase within the hysteresis band of the current command, up to a base motor speed, and limits peak amplitude of actual current in each stator phase to the maximum value of the hysteresis band beyond the base speed.

The control system preferably includes a starter control 50 for initiating rotor rotation. One example of a start-up control is shown in U.S. Pat. No. 4,713,594 entitled "Start-Up Control For Switch Reluctance Motor" by B. K. Bose and P. M. Szczesny.

Absolute rotor position encoder 52 provides position information signals $S_1$–$S_4$, indicative of instantaneous rotor position, for pulse synchronization purposes, to angle control 46 and start-up control 50. The same rotor position information signals can advantageously be processed by speed calculator 56 to generate the actual speed signal $\omega_r$.

Figure 4:
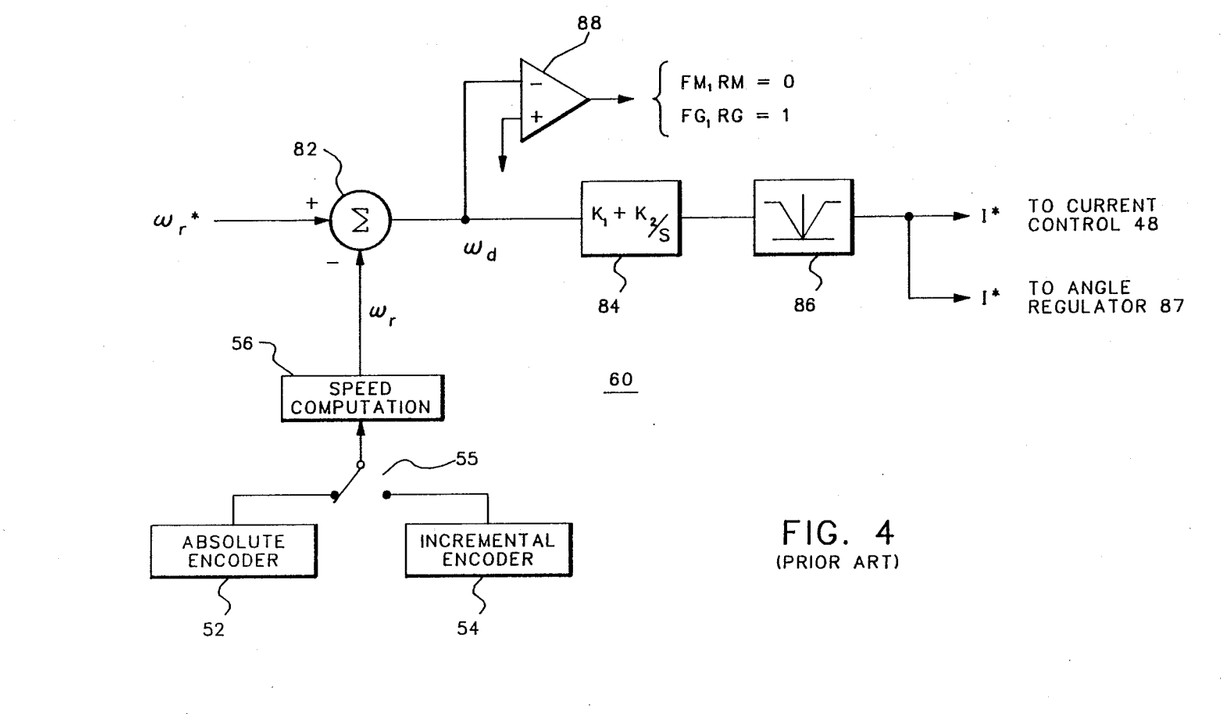
FIG. 4 is an illustration in block diagram form of a typical prior art method and apparatus for generating a current command from motor speeds.

A complete description of the operation of the control system of FIG. 3 is seth forth in U.S. Pat. No. 4,707,650. The present invention provides an improvement to the feedback control block 44 to provide more accurate and better tracking of the $\theta_O$ and $\theta_{pw}$ angles for providing turn-on and turn-off commands to the angle control block 46 during forward and reverse motoring. Before describing an implementation of the present invention, reference is first made to FIG. 4, where there is illustrated a speed control loop 60 which can be used to implement feedback control 44 of FIG. 3. The control loop 60 includes a summation circuit 82 for comparing a speed command $\omega_r*$ with actual speed $\omega_r$ and generating a speed difference signal $\omega_d$ therefrom. Speed command $\omega_r*$ is operator input while the actual speed is calculated by speed calculator 56 from rotor position information signals provided by either absolute encoder 52 or incremental encoder 54 as was described with regard to FIG. 3. This speed difference signal from summation circuit 82 is processed by a proportional plus-integral compensator 84 and absolute value circuit 86 to produce current command I*. The speed difference signal is also applied to the negative input of a polarity detector 88, the positive input of which is grounded. The output signal of polarity detector 88 is used to differentiate between motoring quadrants and generation quadrants and may be employed to coordinate turn-on and pulse width angles with motor operating quadrants. Current command I* is provided to the current control 48 as shown in FIG. 3.

Figure 5:
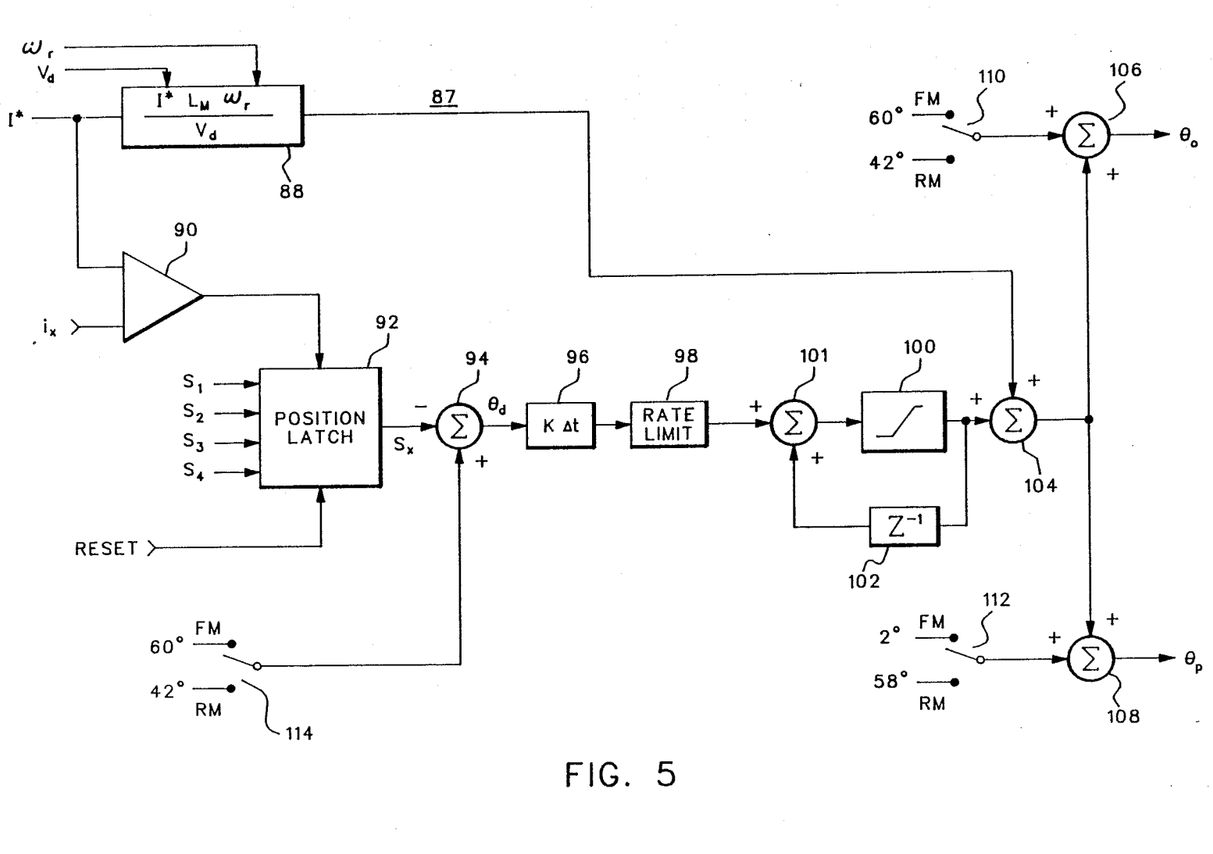
FIG. 5 is an illustration in block diagram form of an advance angle regulator in accordance with the present invention.

In accordance with the present invention, the I* current command signal is also supplied to an advance angle regulator 87, that is, a $\theta_O$ and $\theta_p$ computation subsystem illustrated in block diagram form in FIG. 5. In the advance angle regulator, the current command I* is compared with a phase current reference $i_x$ (which may be $i_a$, $i_b$, $i_c$ or $i_d$) in a comparator 90 to determine when the phase current first reaches the commanded value. In the preferred embodiment, a single phase current $i_x$ is shown with a single comparator and is all that is necessary because the other phases will follow due to the fixed angular relationships of the rotor and stator; however, it will be recognized that this may represent current in each of the phases of the multi-pole motor illustrated in FIG. 1, with the current in each phase being taken one at a time for comparison to the current command signal I*. When the phase current $i_x$ reaches the reference value I*, the comparator 90 changes state causing a latch 92 to retain the rotor position as indicated by the encoder signals $S_1$-$S_4$ so that a record is obtained of the rotor position at the instant that the phase current reached the commanded value. A reset signal is provided to insure that the rotor position which is latched by the latch 92 is a first position at which the current reaches the reference level established by the I* signal. The reset signal resets the latch, or clears the latch, after the current pulse in the presently monitored phase reaches zero and may be generated from the angle control block 46 of FIG. 3 at the turn-off angle $\theta_p$. The specific implementation of connections to monitor the current pulse in each of the phases of the switched reluctance motor is well known in the art and is not shown in FIG. 5.

The latched position at which the phase current $i_x$ reaches the commanded value I* is compared with the turn-on angle set by the characteristics of the system at low speed. For example, for the illustrative motor, the angle is set at 60° as shown in FIGS. 2A-2C and this position is compared with the position stored in the latch 92. Any difference in the two positions results in an error signal when the two signals are summed in summing junction 94. The difference signal from summing junction 94 is indicated as $\theta_d$.

The advance angle regulator 87 has two basic parts, a feed forward portion and an integral portion. The integral portion is illustrated by blocks 96, 98, 100 and 102. The feed forward portion is illustrated by the block 88. The feed forward portion 88 has been found to be advantageous at high speeds when the commanded current is at relatively high values. At that time, there may not exist any feedback available to the integral portion since the actually monitored phase current $i_x$ may never reach the commanded current value I*. At lower speeds, the feed forward portion 88 improves the dynamic response of the regulator by predicting the rise time of the current in each phase. For example, the rise time can be shown to be equal to the commanded value of phase current I* times the minimum inductance $L_m$ of the phase measured at an unaligned rotor position multiplied by the angular velocity $\omega_r$ of the rotor and divided by the source voltage DC level, $V_d$. In performing this calculation, the block 88 approximates the rise time of the current based on the assumption of constant minimum inductance and no CEMF. The actual rise time will be appreciated to be longer than the ideal value and is therefore compensated for by the integral portion of the system of FIG. 5. The blocks 96, 98 and 102 constitute an integral regulator, although a proportional plus integral regulator could be used, both of a type well known in the art. The particular embodiment illustrated is that implemented by a digital microprocessor. It will be recognized by those skilled in the art that an analog implementation could be constructed and that the functional blocks may be modified accordingly. The gain of the integrator is developed by the block 96 which multiplies the $\theta_d$ signal by the product of the desired gain and a sample time, $\Delta t$. The rate limit block 98 limits the rise time of the signal from the block 96. The block 100 places an upper and lower clamp on the amplitude of the signal to limit its excursion during transients. Block 102 constitutes a one-sample delay, the output of which is the previous output of block 100 which is summed in block 101 with next occurring data. The output of the integral portion of FIG. 5 is summed at summing junction 104 with the feed forward signal from block 88. The resultant angular position adjust signal is then summed in block 106 with the preselected optimum turn-on angle position to produce the final compensated turn-on angle $\theta_O$. Similarly, the signal from summing junction 104 is summed in another summing junction 108 with the preselected optimum turn-off angle to produce the compensated turn-off angle $\theta_p$. As indicated schematically by switches 110, 112 and 114, the turn-on angles may be selected to be different angles for forward motoring (FM) or reverse motoring (RM).

The phase current pulses are thus controlled by selecting the optimum turn-on ($\theta_o$) and turn-off ($\theta_p$) angles at very low speeds where the current rise time is negligible. These angles are then fixed throughout the entire speed range of the motor as shown in 110 and 112 of FIG. 5. The output of the position adjust system of FIG. 5 developed at an output terminal of summing junction 104 is added to these optimum turn-on and turn-off angles at speeds where the current rise time is significant. The closed loop regulation of the position at which the phase current actually reaches the commanded value assures that the current reaches its set point at the optimum angle. By using this advance angle regulator, the torque versus current command has a transfer function that does not depend upon speed or DC source voltage over a wide range of speeds, voltages and torques. In other words, the machine output torque is a function of the current command and becomes essentially invariant with changes in speed or voltage.

While the invention has been illustrated in a functional block diagram in FIG. 5, it will be appreciated that the invention may be implemented in either a microprocessor based programmable control or in a hardware based design. While the invention has been described in what is presently considered to be a preferred embodiment, it will be obvious to those skilled in the art that numerous variations, changes and modifications can be made in the system without departing from the invention. Accordingly, it is intended that the invention be limited only by the spirit and scope of the appended claims.

What is claimed is:

1. A closed loop control system for a multi-phase switched reluctance motor responsive to a commanded motor speed signal representative of a commanded motor speed for switching current in each winding phase on and off in synchronism with rotor position, comprising:
   means for generating signals representative, respectively, of rotor position and actual rotor speed;
   comparing means for comparing the commanded motor speed signal and said actual rotor speed signals and for generating from the difference therebetween a signal representative of a commanded motor current;
   means for providing at least one actual motor current signal representative of actual current in a corresponding phase of the multi-phase motor;
   current control means responsive to the commanded motor current signal and to said at least one actual motor current signal for regulating the motor current in a manner to minimize any difference between the actual motor current and the commanded motor current;
   means for providing signals representative of turn-on and turn-off angles corresponding to preselected rotor position angles at which current is to be turned-on and turned-off for each winding phase of the multi-phase motor in order for actual motor phase winding current to reach said commanded current at a preselected rotor angular position for each phase;
   means for comparing said at least one actual motor current signal with said commanded motor current signal for determining rotor angular position at the instant that actual motor current in said corresponding phase of the motor reaches said commanded motor current; and
   adjusting means responsive to said determined rotor angular position for adjusting said turn-on angle in a manner to minimize any difference between said determined rotor angular position and said preselected rotor angular position.

2. The closed loop control system of claim 1 wherein said turn-off angle signal is selected to follow said turn-on angle signal by a predetermined interval, said turn-on angle adjusting means being operative to adjust said turn-off angle in a manner to maintain said predetermined interval.

3. The closed loop control system of claim 2 wherein said predetermined interval comprises an angular rotational displacement of the rotor.

4. The closed loop control system of claim 1 wherein said comparing means comprises:
   comparison means connected for receiving said commanded motor current signal and further connected for receiving said at least one actual motor current signal, said comparison means providing an output signal of predetermined logical significance when said actual motor current signal reaches the same value as said commanded motor current signal; and
   latch means connected for receiving signals representative of rotor angular position and said output signal from said comparison means, said latch means being effective to store the rotor angular position at the instant of receipt of said output signal from said comparison means.

5. The closed loop control system of claim 4 wherein said adjusting means comprises:
   means for developing signals representative of the difference between said preselected turn-on angle and said rotor angular position at the instant of receipt of said output signal from said comparison means;
   means connected for receiving said difference signals and for generating integral signals representative thereof; and
   means for algebraically summing said integral signals with said preselected turn-on angle signal for establishing said adjusted turn-on angle signal.

6. The closed loop control system of claim 5 and including compensation angle compensation means for establishing a turn-on angle compensation signal independent of actual motor current, said compensation signal being summed with said integral signals for summing with said preselected turn-on angle signal.

7. The closed loop control system of claim 6 wherein said compensation angle establishing means comprises means for computing the product of said commanded current, said actual rotor speed and the minimum phase inductance and for dividing the resultant product by the magnitude of voltage applied to the phase windings for generating said compensation signal.

8. A method for operating a multi-phase switched reluctance motor using a closed loop control system for switching current in each winding phase on and off in synchronism with rotor position, the method comprising the steps of:
   generating signals representative respectively of rotor position and a commanded motor current;
   providing signals representative of actual current in each phase of the multi-phase motor;
   regulating the motor current in response to the commanded motor current signal and to the actual motor current signals in a manner to minimize any difference between the actual motor current and the commanded motor current;
   providing turn-on and turn-off angle signals corresponding to preselected rotor position angles at which current is to be turned-on and turned-off for each winding phase of the multi-phase motor in order for actual motor phase winding current to reach the commanded current at a preselected rotor angular position for each phase;
   comparing at least one of the actual motor current signals to the commanded motor current signal and determining rotor angular position at the instant that actual motor current in a corresponding phase of the motor reaches the commanded motor current; and
   adjusting the turn-on angle in response to the determined rotor angular position in a manner to minimize any difference between the determined rotor angular position and the preselected rotor angular position.

9. The method of claim 8 wherein the turn-off angle signal is selected to follow the turn-on angle signal by a predetermined interval, the turn-off angle being adjusted in a manner to maintain the predetermined interval.

10. The method of claim 9 wherein the predetermined interval comprises an angular rotational displacement of the rotor.

11. The method of claim 8 wherein said step of comparing comprises the substeps of:
receiving the commanded motor current signal and an actual motor current signal representative of current in a corresponding one of the phase windings of the motor, and providing an output signal of predetermined logical significance when the actual motor current signal reaches the same value as the commanded motor current signal; and
receiving signals representative of rotor angular position and the output signals from said step of comparing and storing the rotor angular position at the instant the actual motor current in the corresponding phase reaches the commanded motor current.

12. The method of claim 11 wherein said step of adjusting comprises the substeps of:
developing difference signals representative of the difference between the preselected turn-on angle and the rotor angular position at the instant the actual motor current reaches the commanded motor current;
receiving the difference signals and generating integral signals representative thereof; and
summing the integral signals with the preselected turn-on angle signal and thereby establishing the adjusted turn-on angle signal.

13. The method claim 12 and including the steps of establishing a turn-on angle compensation signal independent of actual motor current, summing the compensation signal with the integral signals and summing the resultant signal with the preselected turn-on angle signal.

14. The method claim 13 wherein said step of establishing a compensation angle comprises the step of computing the product of the commanded current, the actual rotor speed and the minimum phase inductance and dividing the resultant product by the magnitude of voltage applied to the phase windings for generating the compensation signal.

* * * * *

UNITED STATES PATENT AND TRADEMARK OFFICE
CERTIFICATE OF CORRECTION

PATENT NO. : 4,933,620

DATED : June 12, 1990

INVENTOR(S) : Stephen R. MacMinn and James W. Sember

It is certified that error appears in the above-identified patent and that said Letters Patent is hereby corrected as shown below:

Column 1, before line 6, insert following paragraph:

--This invention was made with Government support under prime contract DAAE-07-84-C-R083 awarded by the Department of Defense. The Government has certain rights in this invention.--

Column 7, line 64, after "100" insert --, 101--.

Column 8, line 17, after "98" insert --, 100, 101--.

Signed and Sealed this

Eighteenth Day of June, 1991

Attest:

HARRY F. MANBECK, JR.

*Attesting Officer*  *Commissioner of Patents and Trademarks*